United States Patent Office 3,217,035
Patented Nov. 9, 1965

3,217,035
FLUORINATED POLYOLS
James D. Lazerte and Richard A. Guenthner, St. Paul, Minn., assignors to Minnesota Mining and Manufacturing Company, St. Paul, Minn., a corporation of Delaware
No Drawing. Filed Sept. 7, 1961, Ser. No. 136,458
5 Claims. (Cl. 260—556)

This invention relates to new and useful fluorine containing sulfonamido polyols and in their prepartion. In one aspect the invention relates to perfluoroaliphatic sulfonamido polyols and polymers prepared therefrom.

Monofunctional fluorinated alcohols, such as the N-alkanol perfluoroalkanesulfonamides, have been used as intermediates, as surface active agents and as surface treating agents. When used as intermediates the hydroxylated terminal group of the alcohol provides a point of reactivity which enables the preparation of many derivatives, as is evident to those familiar with the various reactions of monofunctional alcohols. The other end of such molecules, i.e., the perfluoroalkanesulfonamido radical, is inert, nonpolar and is moreover both hydrophobic and oleophobic, Such a unique combination of properties has made such compounds useful as surface active agents. Moreover, such monofunctional compounds can be used to modify the properties of certain polymers which have available carboxyl groups for condensation with the hydroxyl group of the alcohol. However, it has been desirable to prepare a fluorinated polyol which can itself be used as a polyfunctional monomer in a polymerization system and which also be used as an intermediate in the preparation of innumerable new and useful adducts and polymers.

It is therefore an object of this invention to provide highly fluorinated sulfonamido polyols and derivatives thereof.

It is also an object of this invention to provide polyhydroxyl perfluoroaliphatic sulfonamido compounds and derivatives thereof.

A further object of this invention is to provide a method for preparing highly fluorinated sulfonamido polyols.

Still another object of this invention is to provide polymers and other useful reaction products of highly fluorinated sulfonamido polyols.

The highly fluorinated sulfonamido polyols of this invention have the formula $$R_fSO_2N(R')Z$$

wherein $R_f$ is a perfluoroaliphatic (including perfluorocycloaliphatic, as defined and used herein) radical having from 1 to about 18 carbon atoms, preferably 4 to 12 carbon atoms, R' is hydrogen or an alkyl radical having from 1 to 12 carbon atoms, preferably from 1 to 8 carbon atoms, and Z is a monovalent organic radical having at least two hydroxy substituents. Z may be aliphatic, aromatic, alicyclic, or arylaliphatic.

The preferred polyols have 2 to 3 hydroxy groups per molecue. Illustrative compounds include 1,2-propanediol-3-(N-ethyl perfluorooctanesulfonamide);

1,5-hexanediol-6-(N-ethyl perfluorooctanesulfonamide);
1,2 - propanediol - 3 - (N - propyl perfluoroethane sulfonamide);
1,2 - propanediol - 2 - (N - ethyl perfluorododecanesulfonamide);
1,5 - hexanediol - 6 - (N-ethyl perfluorobutylcyclohexanesulfonamide);
1,2-propanediol-3-(N-isopropyl perfluorooctanesulfonamide);
1,2,3-butanetriol-4-(N-ethyl perfluorooctanesulfonamide);

$$C_8F_{17}SO_2N(C_2H_5)CH_2CHOHCH_2OCH_2CHOHCH_2OH$$

The above fluorinated polyols may be prepared by reacting the alkali metal salt, e.g., sodium, potassium, etc., of a fluorinated sulfonamide of the formula $$R_fSO_2N(R')H$$

(as disclosed and prepared in U.S. 2,732,398) with a halohydrin, preferably an alpha halohydrin, (e.g., chlorohydrin, bromohydrin, iodohydrin) prepared from a polyol having at least three hydroxyl groups and preferably having from 3 to 6 carbon atoms. The aliphatic polyols included glycerol; sobitol; 1,2,3-butanetriol; pentaglycerol; 1,2,3,4-butanetetrol; 1,2,3,4,5-pentanepentol; mannitol; pentaerythritol; 1,2,6-hexanetriol, propylene oxide addition products of dipropylene glycol (e.g., Niax diols of Union Carbide Chemicals Co.), propylene oxide addition products of 1,2,6-hexane triol and glycerine (e.g., Niax triols of Union Carbide Chemicals Co.), etc., at an elevated temperature, preferably above 100° C., e.g., 110° C.–150° C., usually in the presence of a solvent such as carbitols, acetonitrile, ether, dioxane, alcohols (including polyols such as ethylene glycol), etc. The reaction may be conducted in a melt or in either a refluxing or nonrefluxing solvent. Approximate stoichiometric amounts of the reactants can be used, although an excess of the halohydrin is preferred.

Still another procedure for preparing the fluorinated polyols of this invention involves adding a solution of the alkali metal salt of the above fluorinated sulfonamide to a molar excess of an epoxy compound preferably in a mutual solvent, e.g., benzene, followed by addition of an equal amount of distilled water and refluxing on a steam bath until the reaction is complete. After cooling, dilute hydrochloric acid is added to a pH value of about 5, and the product separates as a water insoluble layer which can be recovered by decantation, evaporation of solvent and fractional distillation. The epoxy compounds which may be used as reactants have either at least one reactive epoxy group and a hydroxy substituent or at least two reactive epoxy groups. Illustrative of these epoxy compounds are the epoxylated novolac resins, the diglycidyl ethers (e.g., diglycidyl ether, diglycidyl ether or bisphenol A), higher molecular weight epoxy resins produced from epichlorohydrin and bisphenol A (such as the hydroxyl substituted Shell Epon 1001), glycidyl ethers of glycerol, glycidyl ethers of bisphenol F, glycidyl ethers of tetrakis (hydroxyphenyl) ethane, butadiene dioxide; epoxidized polybutadienes (e.g., Oxiron 2000, Food and Machinery Co.); 3,4-epoxy-6-methylcyclohexylmethyl-3,4-epoxy-6-methylcyclohexanecarboxylate; 1 - epoxyethyl-3,4-epoxycyclohexane; etc.

Yet another procedure for preparing the fluorinated polyols of this invention involves the reaction of an unsaturated halide, particularly an unsaturated bromide, prepared from the corresponding unsaturated alcohol, with the alkali metal salt of the above fluorinated sulfonamide to form the unsaturated amide, then epoxidizing the ethylenic linkage in the usual manner and hydrolyzing the epoxy group to the corresponding polyol. This procedure may be modified by first epoxidizing the unsaturated halide and hydrolyzing the epoxy group to form a halohydrin of a polyol, then following the first preparative technique described earlier. Illustrative of such unsaturated alcohols are: 2-ethylidene-1-heptanol, 1-phenyl-2-hydroxy-butene-3, 3-phenyl-2-hydroxy-pentene 3, 2-phenyl-2-hydroxy-pentene-4, 2-methyl-2-hydroxy-pentene-4, 5-hydroxy-hexene-1, 11-hydroxy-undecene-1, etc.

The following examples will serve to illustrate the preparative procedures.

EXAMPLE I

N-propyl perfluorooctanesulfonamide (54.1 parts by weight) and 5.4 parts of sodium methoxide were combined in methanol to form the sodium salt of the substituted sulfonamide. The methanol was then removed by heating under vacuum on a steam bath. To the dry solid was added 13.2 parts of glycerol alpha monochlorohydrin (ClCH$_2$CHOHCH$_2$OH) and the mixture was heated with stirring for four hours at 120° C. After the reaction mixture was cooled, 1.7 parts of sodium methoxide as a 25 weight percent solution in methyl alcohol was added and excess methanol was stripped from the reaction mixture. Another 2.6 parts of glycerol alpha monochlorohydrin was added and the mixture heated again for 4 hours at 120° C. The resulting mixture was then dissolved in 100 parts of ethyl ether and filtered to remove the insoluble salts. The filtrate was washed with dilute base and water, then dried, the ether being removed under reduced pressure to give 43 parts of 1,2-propanediol-3-(N-propyl perfluorooctanesulfonamide), a waxy solid with a boiling point of 150–157° C. at 0.5 mg. mercury. The product was soluble in ether, acetone and alcohols. It had very low solubility in water and the hydrocarbons. Analysis: 2.26% N (2.27% theoretical), 5.13% OH (5.52% theoretical). A 0.01% saturated solution in water had a surface tension of 21.4 dryness/cm. at 28° C. A 0.01% solution in 10% aqueous sulfuric acid had a surface tension of 23.6 dryness/cm. In 10% aqueous sodium chloride the 0.01% solution had a surface tension of 22.8 dryness/cm.

EXAMPLE II

A mixture of ClCH$_2$CHOH(CH$_2$)$_4$OH and

CH$_2$OHCHOH(CH$_2$)$_4$Cl was prepared by chlorination of 1,2,6-hexanetriol, after which the product was distilled, B.P. 115–140° C. at 3 mm. mercury pressure. The product, C$_6$H$_{13}$ClO$_2$, analyzed 48.3% C., 8.5% H., 22.1% Cl (theoretical 47.4% C., 8.54% H., 23.0% Cl). The 1,2-diol was destroyed by reacting the product mixture with periodic acid in water, as quantitatively determined by periodate titration. The organic, water insoluble residue

[ClCH$_2$CHOH(CH$_2$)$_4$OH]

with probable small quantities of

CH$_2$OHCHCl(CH$_2$)$_4$OH was then recovered and reacted with the sodium salt of N-ethyl perfluorooctanesulfonamide in the manner described in Example I. The resulting primary product, 1,5-hexanediol-6-(N - ethyl perfluorooctanesulfonamide), M.P. 81–83° C., analyzed 31.1% C. and 2.26% N (theoretical 29.9% C., 2.18% N) after recrystallization from ethanol.

EXAMPLE III

Into a 1-liter flask was charged 100 grams of

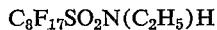

(0.19 mole) and 12 grams of NaOCH$_3$ (0.19 mole) dissolved in 300 grams of absolute methanol. The solution was refluxed on a steam bath for one-half hour. This solution was then added slowly with stirring to 200 grams of butadiene dioxide (excess), after which 500 grams of distilled water was added. After refluxing on a steam bath for one-half hour, and then cooling, dilute hydrochloric acid was added to give a pH of 5, at which point a brown oily layer separated. The aqueous layer was decanted and the raffinate was washed with 200 ml. of water and dissolved in ether. A dark, wax-like product remained after evaporation of the ether. The product was fractionated under a vacuum of 0.3–0.4 mm. of mercury, and the fraction distilling at 172–182° C. (0.30–0.35 mm. mercury) was collected. This product was a hard, waxy, white solid, M.P. of 66° C., B.P. 172–183° C./0.35 mm. Hg. The yield was 26 grams, 17% of theory. The final acid value was less than 3. The percent nitrogen by weight was 2.16% (theoretical 2.15%). An equivalent amount of linseed fatty acids reacted to a low acid value with the triol product indicating a hydroxyl equivalent of 200–225 (theoretical 215). Infrared analysis indicated no —NH absorption and absorption in the —OH, —SO$_2$ and CF regions. This product was identified as C$_8$F$_{17}$SO$_2$N(C$_2$H$_5$)CH$_2$(CHOH)$_2$CH$_2$OH and is illustrative of the compounds of the generic structure described earlier in which Z is beta-hydroxy substituted.

The unique structure of the fluorinated polyols of this invention suggest their use in a wide variety of practical applications. The polyhydroxy portion of the molecule provides a hydrophilic solubilizing terminal structure which renders the molecule sufficiently soluble in water and other hydroxylated or oxygenated solvents to permit its functioning therein as a surface active agent. As such it may be used as a dispersing or emulsifying agent in aqueous polymerization systems, in polishes and waxes, and as additives to various other compositions. The plurality of hydroxyl groups also provides a means for bonding the molecule to a substrate surface when the compound is employed for surface treatment. Thus, in the treatment of hydrophilic materials, such as paper, cloth, leather, metals, ceramic articles and glass, a solution of these fluorinated polyols can be prepared which is useful for treating the surface to provide, upon evaporation of the solvents, a thin coating of oriented molecules, the polar portions being bonded to the substrate with the non-polar or fluorinated portions projecting to provide a fluorocarbon-like outer surface that is repellent to water, oils and greases. The polyhydroxylated portion of the polyol molecules also provides a polyfunctional group to enable the preparation of many derivatives which are obtainable from relatively long chain polyol compounds, as will be evident to those skilled in the art of polyol derivatives. In one particular, the present fluorinated polyols can be employed in making a wide variety of ester derivatives by reaction with acid compounds. Acrylate and methacrylate half-esters, for example, provide polymerizable monomers which can be used to make novel, useful polymers in the manner described in U.S. Patent 2,803,615. Such unsaturated half-esters undergo vinyl-type polymerization, and the resulting side-chain contains a hydroxyl group in addition to the fluorinated sulfonamido radical. Such side-chain hydroxyl groups may be utilized as a means for cross-linking or curing the resultant polymer or for further modification thereof through reaction with carboxylic, isocyanate, epoxy, or azirane ring containing compounds.

Because of the polyfunctionality of these fluorinated polyols, they can be utilized as monomers in polymerization systems, such as in polyesters, polyisocyanates, epoxy resins, and other systems in which hydroxyl groups participate in the polymerization reaction, for example through addition or condensation mechanisms. The resulting polymers may be used as protective coatings on various substrates, including wood, glass, metal, ceramics, textile fabrics, leather, paper, etc. The following examples will illustrate some of the various reactions of these fluorinated polyols and the useful products obtained thereby.

EXAMPLE IV 86 parts of 1,2-propanediol-3-(N-propyl perfluorooctanesulfonamide) was dissolved in 86 parts by weight of dry ethyl acetate by warming in a flask with stirring. To this solution was added 48.7 parts of 2,4-toluene diisocyanate in an equal weight of dry ethyl acetate. The reaction mixture was warmed to 40° C. and 0.5 part of triethylamine was added. After the small exotherm was completed, heating was continued at 2 hours at 60° C. to give a 40% solid solution in ethyl acetate of the 2:1 molar adduct of the diisocyanate and the diol. A portion of this adduct was diluted to 1% solids with trichloroethylene, and the solution was used to treat crust leather by padding. After drying, the leather exhibited good oil and water repellencies. A 0.5% by weight solution used to treat a worsted textile fabric also imparted good oil and water repellency to the fabric.

The AATCC Spray Test 22—1952 was used to measure water repellency. Since there is no standard test for the measurement of oil repellency of fabrics, the following empirical test, which has been found to yield significant and reproducible results, was employed.

The oil repellency test is based on the different penetrating properties of two hydrocarbon liquids, i.e., mineral oil (Nujol) and n-heptane. Mixtures of these two liquids are miscible in all proportions and show penetrating properties in proportion to the n-heptane content of the mixture. The oil repellency numbers were selected to correspond to the AATCC Standard Spray Ratings (AATCC 22—1952), which measure water repellency. The technique for measuring oil repellency is as follows:

Swatches (8-inch by 8-inch) of the treated fabric are placed on a flat table. Test mixtures of various concentrations of n-heptane and mineral oil by volume are contained in small dropping bottles. A drop of each mixture is gently placed, not dropped, onto the fabric surface, preferably in two different portions of the test swatch. After the drops have been allowed to stand undisturbed for three minutes, the fabric appearance is observed through the oil drop. Penetration or wetting, as evidenced by darkening, is noted. The number of the highest proportion of n-heptane, which does not penetrate or wet the fabric after three minutes contact is called the oil repellency of the specimen. The division between failure or resistance of successive test mixtures is generally quite sharp, presenting little problem in determining the break point. The following test mixtures are employed, the higher rating being the more oil repellent.

EXAMPLE V

This example illustrates the use of the fluorinated polyols of this invention in the preparation of a diurethane resin.

61.5 parts of the adduct described in Example IV in ethyl acetate was mixed with 13.4 parts of trimethylol propane. After the solvent was removed, the resulting polyurethane was heat-cured to a clear brittle glass. This cured polyol exhibited the properties of a clear, thermosetting resin.

A 2% solid solution of the uncured resin in ethyl acetate was padded onto crust-leather and dried, imparting improved oil and water repellency characteristics to the leather.

EXAMPLE VI 61.5 parts of the adduct of Example IV in ethyl acetate was combined with 10 parts polyethylene glycol (200 average molecular weight). The solvent was removed by heat and the residue cured at 60° C. for two hours. A clear, brittle film was formed. The resin in the uncured state was padded onto crust leather at 2% solids in perchloroethylene, imparting good oil and water repellency characteristics to the leather.

EXAMPLE VII

The adduct of Example IV was reacted with three different ratios of polypropylene glycol (2025 average molecular weight) to demonstrate the type of polyurethane resins obtainable. When equal molar quantities of the adduct and the polypropylene glycol were mixed in solvents and then cured at 110° C., a viscous tacky adhesive was formed. When two moles of the above adduct were reacted with one mole of the above polypropylene glycol and cured at 100° C., a semi-tacky rubber was formed which imparted good oil repellency to leather when padded thereon in solvent solution.

The reaction of 157.8 parts of the above adduct in ethyl acetate solution with 101.3 parts of the above polypropylene glycol with or without catalysts followed by curing at 100° C. produced a very tough, clear flexible polyurethane resin which remained flexible at −70° C. and had good adhesion both to metal and glass. When this resin was applied to glass, it could not be removed from the container. When the glass was struck with a hammer, the glass pulverized but the glass particle remained in place and could not be removed. In view of its good low temperature flexibility and excellent adhesion to glass, such resin is extremely useful in a safety glass laminate construction. Immersion tests run on strips of this resin indicated excellent resistance to weight gain, swell and color change in water, 10% sulfuric acid, 36% hydrochloric acid, and 2% sodium hydroxide. Hydrocarbon resistance was also very good. The resin can be readily applied to other substrates and used as a protective coating thereon. The uncured resin, when padded on various products at 0.8 weight percent in carbon tetrachloride and cured for 10 minutes at 140° C., produce the following oil and repellent properties as determined by the oil repellency tests and water repellency tests as set forth herein.

| Oil repellency rating | Vol. percent heptane | Vol. percent mineral oil |
|---|---|---|
| 100+ | 60 | 40 |
| 100 | 50 | 50 |
| 90 | 40 | 60 |
| 80 | 30 | 70 |
| 70 | 20 | 80 |
| 50 | 0 | 100 |
| 0 | ------ | (¹) |

¹ No holdout to mineral oil.

*Table I*

| Fabric | Oil repellency | Water repellency |
|---|---|---|
| Low gabardine | 50 | 90 |
| Polyester fiber, rayon blend | 70 | 90 |
| Wool flannel | 70 | 90 |
| Cotton jeans cloth | 70 | 90 |

EXAMPLE VIII

The 1,2-dihydroxy propanediol-3-(N-propylperfluorooctanesulfonamide) can be polymerized to form various plastic materials through the reaction of the polyol with materials capable of reacting with polyhydroxy compounds, such as azirane ring containing compounds and diisocyanates. When two parts by weight of the above diol were mixed with one part of N,N'-bis-ethylene-isosebacamide and heated overnight at 100° C., a hard and brittle resin was obtained. A similarly hard resinous product was obtained with a 3:1 weight ratio of the above diol to N,N'-bis-ethylene-isosebacamide. When applied to cotton as a 1% solution, excellent oil repellency ratings were obtained.

The N,N'-bis-ethylene isosebacamide and its method of preparation are described in U.S. Serial No. 840,255, filed September 16, 1959.

EXAMPLE IX

Polyesters can also be made from the polyols of this invention, as illustrated by the following procedure. 35 parts by weight of a fluorinated di-acid chloride,

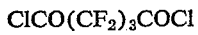

$$ClCO(CF_2)_8COCl$$

was added to 60 parts of a fluorinated diol of Example IV with stirring and with a slight vacuum on the system. A nitrogen purge and a hydrochloric acid acceptor, e.g., pyridine, can be used if desired. Heat was then applied to the mixture and a vacuum was gradually increased until a final temperature of about 100° C. at about 40 millimeters mercury pressure was obtained. The temperature was then lowered and the product dissolved in benzotrifluoride. Water was added to hydrolyze the excess acid chloride groups. Water was separated and the benzotrifluoride removed under vacuum leaving a resin with an acid number of 40. Six parts by weight of this acid when mixed with 3 parts of N,N'-bis-ethylene isosebacamide and heated at 100° C. for 45 minutes produced a hard, cured resin.

EXAMPLE X

To a 2-liter three-necked flask was added

| | Grams |
|---|---|
| $C_8F_{17}SO_2NHC_2H_5$ | 408 |
| Ethylene glycol | 450 |
| 24.5% $NaOCH_3/CH_3OH$ | 184 | and the mixture was heated to 100° C. at 15 mm. vacuum for one hour, then cooled to 50° C. Ninety-five grams of α-chloro glycerolhydrin ($ClCH_2CHOHCH_2OH$) and 5 grams of $NaHCO_3$ was added and the resultant mixture was heated with stirring to 120° C. for 8 hours. After cooling, a small amount of water was added to facilitate phase separation. The bottom phase was removed and distilled at 180° C./2–3 mm. to collect 350 grams of $C_8F_{17}SO_2N(C_2H_5)CH_2CHOHCH_2OH$.

Using a 250 ml. two-necked flask equipped with stirrer, Barrett trap and reflux condenser, the following were added:

| | | |
|---|---|---|
| 0.150 eq. isosebacic acid | grams | 15.2 |
| 0.125 eq. $C_8F_{17}SO_2N(C_2H_5)CH_2CHOHCH_2OH$ | do | 38.6 |
| .001 eq. trimethylol propane | do | 0.4 |
| Toluene | cc | 20 |

After filling the trap with toluene, the mixture was stirred and heated slowly to 200° C., and water was removed azeotropically. Thereafter, it was cooled, evacuated to 15 mm., reheated to 200° C., cooled, and the polymeric product recovered.

EXAMPLE XI 120.2 parts by weight of 1,2-propanediol-3-(N-ethyl-perfluorooctanesulfonamide), 58.4 parts of isosebacic acid, 1.6 parts of trimethylol propane and about 0.15 part of stannous oxalate and about 10 parts of toluene were combined. The mixture was then heated and stirred with the water being removed azeotropically until the temperature reached 200° C. The mixture was then cooled and reheated slowly under vacuum to about 140° C. The resulting polymeric product was a homogeneous, viscous liquid.

EXAMPLE XII

Using a 200 milliliter two-necked flask equipped with a stirrer, Barrett trap and reflux condenser, the following were added:

0.15 equivalent isosebacic acid (15.2 grams).
0.125 equivalent 1,2-propanediol-3-(N-ethyl perfluorooctanesulfonamide) (38.6 grams).
0.001 equivalent trimethylolpropane (0.4 grams).
Toluene 20 cc.

After filling the trap with toluene, the mixture was stirred and heated slowly to 200° C. and water was removed azeotropically. Thereafter, the mixture was cooled, the flask evacuated to 15 millimeters mercury pressure, the mixture reheated to 200° C., cooled, and the polymeric product recovered. This polymeric product can be cured with a bisamide, e.g., N,N'-bis-ethylene isosebacamide, by heating to 100° C. for about 1 hour.

EXAMPLE XIII

To a 2-liter glass flask equipped with thermometer, stirrer and reflux distilling head was charged 269 grams of phthalic anhydride, 257 grams of soybean acids, 35 grams of xylene and 98 grams of $$C_6F_{13}SO_2N(C_3H_7)CH_2CHOHCH_2OH$$

The mixture was heated to 160° C. and maintained at this temperature for 1 hour to insure reaction of the fluorinated polyol, after which 149 grams of glycerol was added. The resulting mixture was heated for 5 hours at 210° C. to attain an acid number of 10. The solids content was reduced to 50% by addition of xylene and cobalt and lead naphthenate driers were added to aid in air oxidation of the oil constituent. Films were prepared by spraying and dip coating glass and metal panels, curing being accomplished either by air drying or by heat curing at 300° F. for from 15 to 45 minutes. For increased surface hardness and mar resistance 10% of melamine-formaldehyde resin may be added. The resulting films displayed good resistance to both water and oil.

EXAMPLE XIV

This example describes the preparation of a fluorochemical alkyd resin with a low oil to glycerol phthalate ratio, i.e., only 25% of the resin is oil-acid.

To a 2-liter glass flask equipped as in Example XIII was charged 240 grams of phthalic anhydride, 188 grams of dehydrated castor oil acids, 156 grams of $$C_8F_{17}SO_2N(C_2H_5)CH_2CHOHCH_2OH$$

and 40 grams of xylene. After heating the mixture for one hour at 160° C., 130 grams of glycerol (10% excess) was added, and the temperature was raised to 190° C., at which point water was collecting with refluxing xylene. An acid number of 11 was attained after 5 hours at 205° C. Xylene was added during the cooling period to adjust to 50% solids. Films were prepared on panels, as in the preceding example, and cured thereon. These protective coatings provided outstanding oil and water repellency.

EXAMPLE XV

This example illustrates a long oil alkyd resin, i.e., a high ratio of oil-acid to phthalic anhydride. The formulation contained 10% fluorinated diol and 65% linseed oil acids by weight of resin solids. To a 1-liter glass flask was charged 53 grams of phthalic anhydride, 155 grams of linseed oil acids (alkali refined), 20 grams of $C_8F_{17}SO_2N(C_2H_5)CH_2CHOHCH_2OH$ and 38 grams of glycerol (5% excess). The glycerol was added after heating for 1 hour at 160° C. The processing time and temperature was about 8 hours at 230° C. to yield an acid number of 15. This product, having a viscosity of about 400 c.p.s. in 60% mineral spirits, was useful as a brushing varnish or paint due to a longer drying time and good flow properties.

EXAMPLE XVI

This example illustrates the use of a fluorinated polyol in an epoxy polyester system.

To a 2-liter glass flask having a thermometer, stirrer and reflux condenser was charged 109 grams of pyromellitic dianhydride, 150 grams of $$C_8F_{17}SO_2N(C_2H_5)CH_2CHOHCH_2OH$$

and 320 grams of ethyl cellosolve acetate. This mixture was refluxed for 1½ hours at 160° C. until the reaction mass changed from a milky to a clear light brown color, indicating solubility of the dianhydride in the solvent due to reaction with the fluorinated polyol. The dry product had a melting point of 183–185° C. compared to a melting point of 286° C. for pyromellitic dianhydride. This adduct was then mixed with an epoxy resin with an epoxy equivalent of about 1000 (106 grams of adduct solution), 100 grams of epoxy resin and 98 grams of ethyl cellosolve acetate, the solids content being about 50%. Films prepared from this product cured well after 15 minutes at 300° F. and were hard, oil resistant and water resistant.

EXAMPLE XVII

A dry 1-liter flask equipped with reflux condenser, stirrer, thermometer and dry nitrogen gas inlet was charged with 98 grams of toluene diisocyanate, 64 grams of polyether triol (molecular weight 440), 38 grams of $$C_8F_{17}SO_2N(C_3H_7)CH_2CHOHCH_2OH$$

and 66.5 grams of ethyl acetate (urethane grade). The fluorinated polyol was dissolved in the polyether triol, and the toluene diisocyanate was added slowly with the temperature maintained at about 60° C. The temperature was then raised to 80° C. with a hot water bath and the anhydrous ethyl acetate was added to decrease the viscosity. The final solids content was 75%. To 125 grams of this intermediate (NCO/OH=2.0) was added 37 grams of castor oil to yield a ratio of NCO/OH of 1.5. Protective coatings of this product on test panels had excellent air drying properties and were also well cured after 45 minutes at 300° F. Oil and water repellency were good. The amount of the fluorinated polyol in the product was 13.5% by weight. Other systems were also prepared with fluorinated polyol content ranging from about 5% to about 25% by weight of resin solids.

EXAMPLE XVIII

This example illustrates the use of the fluorinated polyols of this invention in the preparation of polyesters.

A 2-liter glass flask equipped with stirrer, thermometer and reflux distillation head was charged with 222 grams of phthalic anhydride, 147 grams of maleic anhydride, 220 grams of propylene glycol, 125 grams of $$C_8F_{17}SO_2N(C_2H_5)CH_2CHOHCH_2OH$$

and 20 grams of xylene. After heating for three hours at 210° C., an acid number of 28 was reached. The fluorinated polyol content was 20% of resin solids. 120 grams of this polyester product was dissolved in 80 grams of styrene. Approximately one gram of benzoyl peroxide was dissolved in the mixture and films were prepared with a draw down bar and were cured at 140° C. for ½ hour. The resulting cured films on test panels displayed very good oil and water repellency and had a good balance of properties.

EXAMPLE XIX

Into a glass reaction flask was charged 25 grams of perfluorohexanesulfonamide, 2.5 grams of sodium methoxide and 25 ml. of aboslute methanol. The reaction mixture was refluxed on a steam bath for about one-half hour, then the methanol was removed under reduced pressure to recover about 26 grams of the sodium salt of the sulfonamide. To the dry solid was added 4.6 grams of 1-chloro-2,3-propanediol (1/1.1 molar ratio of sodium salt to diol), and the mixture was refluxed in toluene at 125° C. for 3 hours. The toluene was then stripped off under reduced pressure, the product extracted with ether, and the extract dried to recover the 1,2-propanediol-3-(N-propyl perfluorohexanesulfonamide).

To a 2-liter glass flask equipped with thermometer, stirrer and reflux head was added 269 grams of phthalic anhydride, 257 grams of soybean acids, 98 grams of the above fluorinated diol and 35 grams of xylene. After heating for 1 hour at 160° C., 149 grams of glycerol was added. After 5 hours at 210° C. an acid number of 10 was attained. Xylene was added to thin the contents to 50% solids, and the usual metallic driers were then added. Water and oil repellent films of the resulting alkyd may be prepared by spraying or dip coating glass or metal panels, which are then either air dried or heat cured at 300° F. for from 15 to 45 minutes. For increased surface hardness and better mar resistance about 10 weight percent (based on total solids) of a melamineformaldehyde resin may be added to the coating composition.

Various other modifications and embodiments will be apparent from the foregoing disclosure and examples to others skilled in the art without departing from either the spirit or scope of this invention.

We claim:
1. A fluorinated polyol having the formula

$$R_fSO_2N(R')CH_2(CHOH)_xCH_2OH$$

wherein $R_f$ is a perfluoroalkane radical having from 4 to 12 carbon atoms, R' is an alkyl radical having from 1 to 8 carbon atoms, and $x$ is an integer from 1 to 2.

2. A fluorinated polyol having the formula $$R_fSO_2N(R')CH_2CHOHCH_2OH$$

wherein $R_f$ is a perfluoroalkane radical having from 4 to 12 carbon atoms and R' is an alkyl radical having from 1 to 8 carbon atoms.

3. A fluorinated polyol having the formula $$R_fSO_2N(R')CHCHOHCHOHCH_2OH$$

12 carbon atoms and R' is an alkyl radical having from 1 wherein $R_f$ is a perfluoroalkane radical having from 4 to to 8 carbon atoms.

4. $C_8F_{17}SO_2N(C_2H_5)CH_2(CHOH)_2CH_2OH$

5. $C_8F_{17}SO_2N(C_3H_7)CH_2CHOHCH_2OH$

References Cited by the Examiner

UNITED STATES PATENTS

| | | | |
|---|---|---|---|
| 2,046,090 | 6/36 | Reed | 260—556 X |
| 2,213,360 | 9/40 | Calcott et al. | 260—556 X |
| 2,334,186 | 11/43 | Fox | 260—556 |
| 2,803,656 | 8/57 | Ahlbrecht et al. | 260—556 |
| 2,809,990 | 10/57 | Brown | 260—556 X |
| 2,915,554 | 12/59 | Ahlbrecht et al. | 260—556 |
| 2,989,512 | 6/61 | Nischk et al. | 260—77.5 |
| 3,044,988 | 7/62 | Otmann et al. | 260—75 |

FOREIGN PATENTS

| | | |
|---|---|---|
| 877,455 | 9/42 | France. |
| 738,703 | 8/43 | Germany. |
| 753,345 | 11/52 | Germany. |

OTHER REFERENCES

Chemical Abstracts, vol. 50, columns 552–5553 (1956), Abstract of Chrzaszcewska et al., Roczniki Chem., vol. 29, pages 479–82 (1955).

WALTER A. MODANCE, *Primary Examiner*.

LOUIS P. QUAST, JOHN D. RANDOLPH, *Examiners*.